May 7, 1940.                D. K. BADERTSCHER                2,200,051
            MEANS FOR LUBRICATING INTERNAL COMBUSTION ENGINES
                    Filed Feb. 2, 1937        3 Sheets-Sheet 1
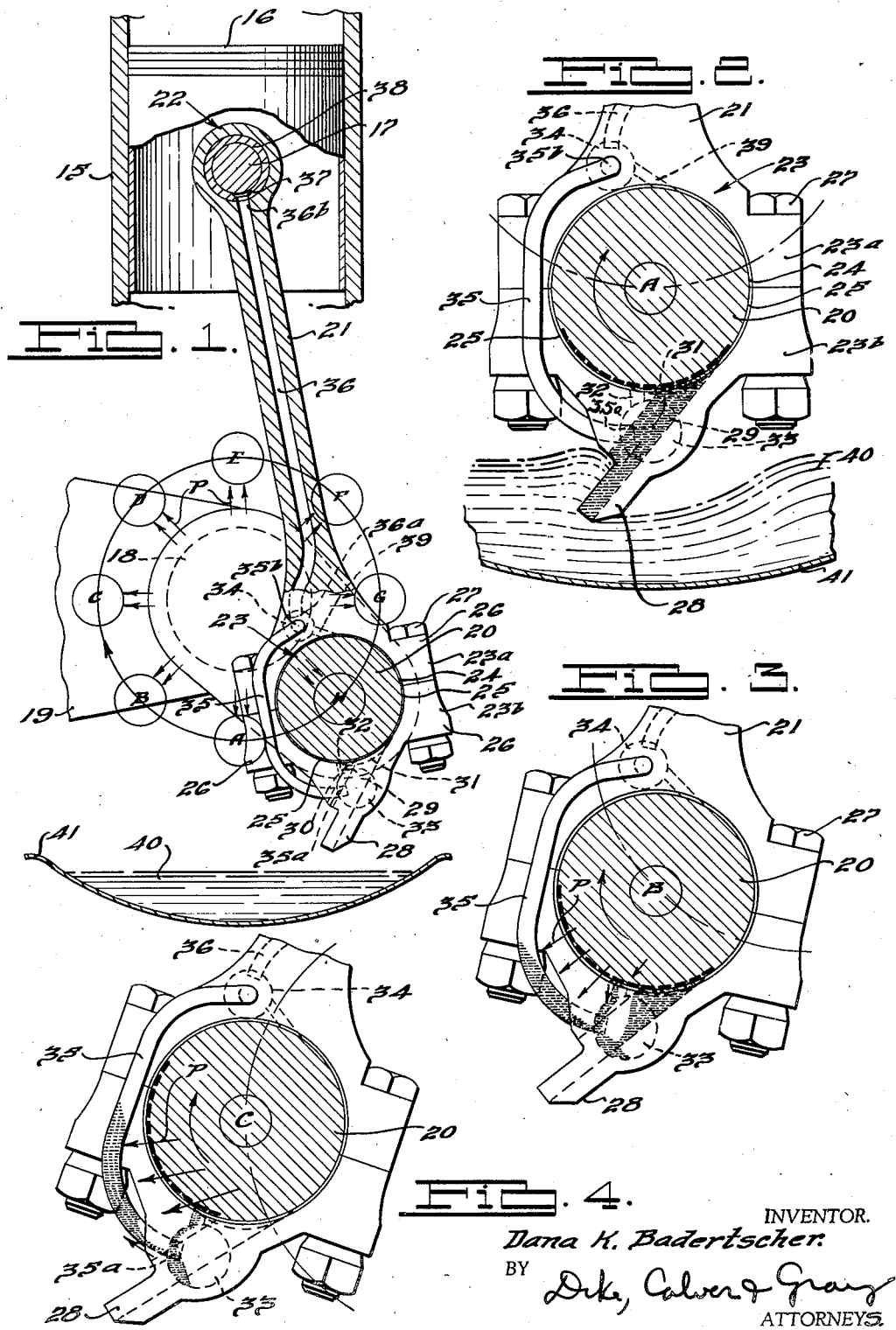
INVENTOR.
Dana K. Badertscher.
BY
ATTORNEYS.

May 7, 1940.  D. K. BADERTSCHER  2,200,051
MEANS FOR LUBRICATING INTERNAL COMBUSTION ENGINES
Filed Feb. 2, 1937  3 Sheets-Sheet 2
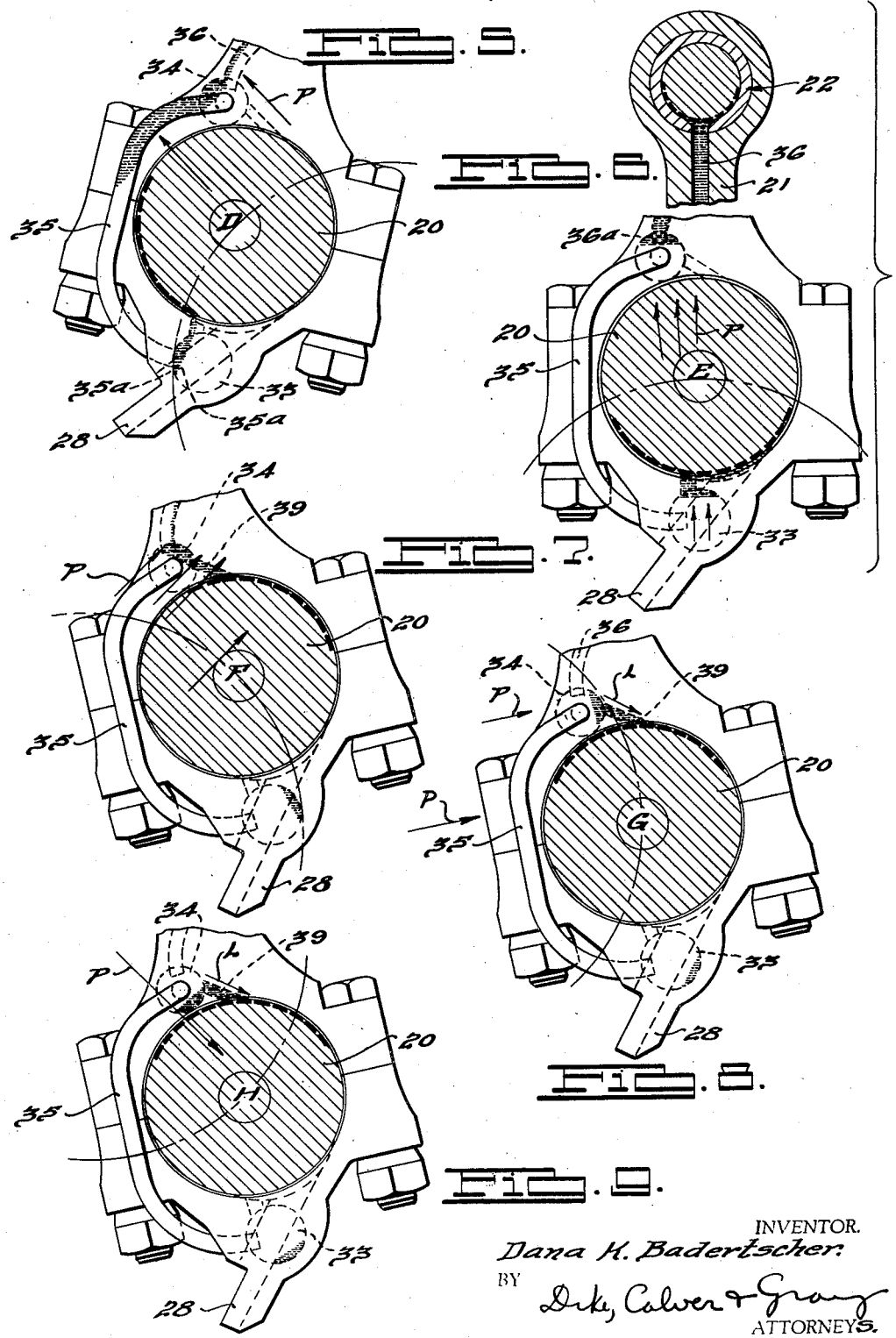
INVENTOR.
Dana K. Badertscher.
BY
ATTORNEYS.

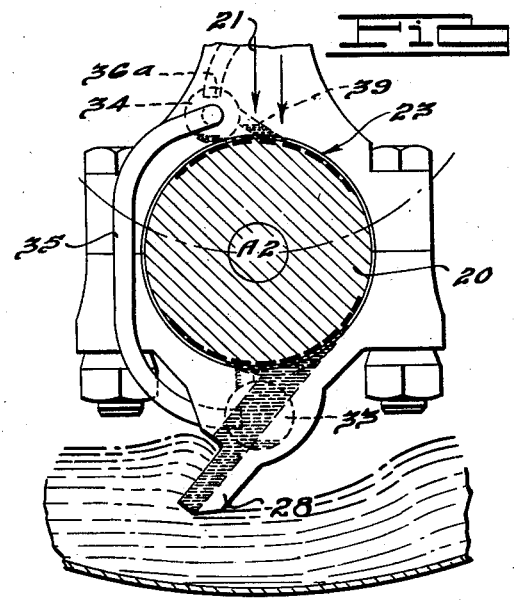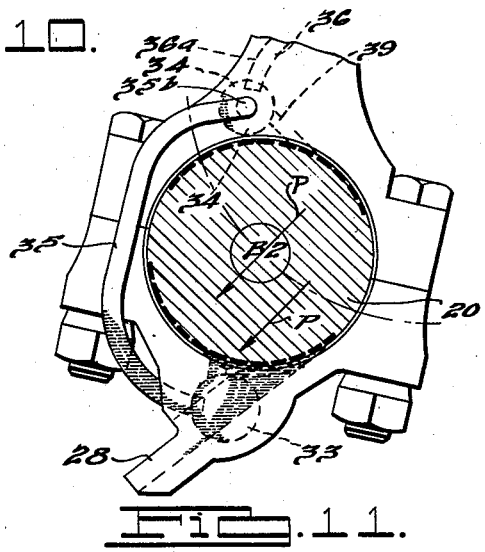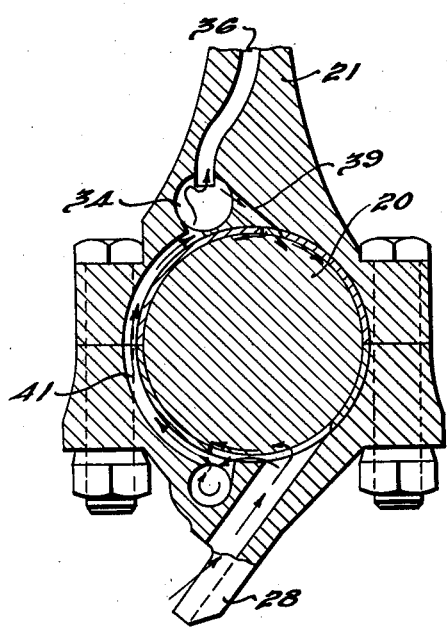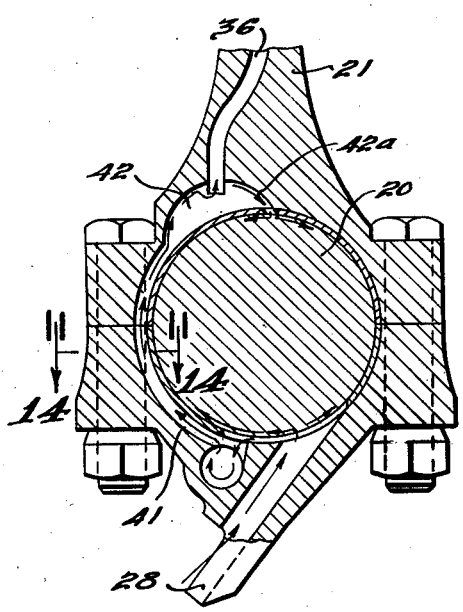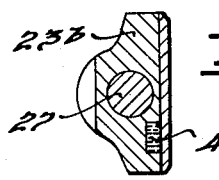

Patented May 7, 1940

2,200,051

UNITED STATES PATENT OFFICE 2,200,051

MEANS FOR LUBRICATING INTERNAL COMBUSTION ENGINES

Dana K. Badertscher, Detroit, Mich., assignor to Hudson Motor Car Company, Detroit, Mich., a corporation of Michigan Application February 2, 1937, Serial No. 123,656

18 Claims. (Cl. 184—11)

This invention relates to lubrication means for internal combustion engines and more particularly to means for lubricating the connecting rod bearings and the piston or wrist pin bearings of such engines. The present invention is particularly, although not exclusively, adapted for engines which operate on what is commonly known as the splash lubrication system.

A connecting rod bearing is loaded at certain localities by the explosion pressure during a certain portion of the crankshaft rotation. The bearing is also loaded at other localities by the inertia loads of the piston and connecting rod. Hence, it will be seen that an adequate supply of oil should be available at the proper locality where the bearing, during rotation of the crankshaft, is loaded. Not only is it important for the proper functioning of the engine and to prevent the bearings burning out that the crank pin bearing surfaces and particularly the loaded portions thereof be adequately lubricated at all times, but it is also important that sufficient lubrication be provided for the wrist pin bearings. One of the primary purposes of the present invention is to provide a proper supply and distribution of lubricant to the bearings and particularly to accomplish this at the proper times in relation to the stroke and the load.

A further object of the present invention is to provide improved lubrication means for internal combustion engines in which centrifugal and inertia forces developed in an engine are utilized for supplying and distributing the lubricant to the connecting rod bearings or crank pins and the piston or wrist pin bearings.

Another object of the invention is to provide lubrication means of the foregoing character in which the pressure of the lubricant varies during the operation of the engine in proportion to the inertia loads which are carried by the lubricated bearing.

Still another object of the invention is to provide lubrication means in which the forces utilized for delivering the lubricant to the respective bearings vary substantially in proportion to the variation of loads imposed on said bearings because of variations in the rotative speed of the engine.

A further object of the invention is to provide a connecting rod for an internal combustion engine, in which means are provided for securing a quantity of lubricant near the lower dead center position of the connection rod and thereupon delivering said lubricant to the crank pin and the piston pin bearings at such pressures and at such instances of the revolution of the engine as is required by the changes in loads carried by said bearings.

A still further object of the invention is to provide a connecting rod of the character specified in which a plurality of storage reservoirs is provided for the purpose of entrapping a quantity of lubricant during one revolution and using said lubricant during the succeeding revolutions.

A still further object of the invention is to provide a connecting rod having a crank pin bearing and a wrist pin bearing, in which means are provided to deliver at predetermined moments of a particular working cycle quantities of oil to such portions of the working surfaces of said bearings as are subjected to the greatest working pressures.

A still further object of the invention is to provide means for intermittently lubricating a bodily rotatable bearing, in which pressure impulses in the lubricant are created in conduits provided in said bearings, which conduits are adapted to assume at predetermined time instances such positions with respect to the action of the centrifugal force caused by the rotation of the bearing that said force becomes effective to produce fluid pressure and flow in said conduits.

It is an added object of the invention to provide a connecting rod of the character specified, which is relatively simple in construction and relatively cheap to manufacture and repair or service.

Other objects of this invention will appear in the following description and appended claims, reference being had to the accompanying drawings forming a part of this specification wherein like reference characters designate corresponding parts in the several views.

Fig. 1 is a view partly in section showing a portion of an internal combustion engine provided with a connecting rod including the lubrication means embodying the present invention, said view indicating diagrammatically eight reference locations of the crank pin bearing during one complete revolution of the crankshaft of the engine, said locations being indicated by the letters A to H inclusive.

Fig. 2 is a view showing the crank pin bearing and the flow of oil thereto when said bearing is in its lowermost position indicated in Fig. 1 by the letter A.

Figs. 3, 4 and 5 are views similar in part to Fig. 2, the crank pin bearing being shown in the position indicated in said Fig. 1 by the letters B, C and D respectively, direction of the action of the centrifugal force and the direction of the flow of lubricant in the conduits being shown by means of arrows.

Fig. 6 is a view showing the crank pin and the wrist pin bearings and the flow of lubricant in the conduits when the connecting rod is at its upper most position.

Figs. 7, 8 and 9 show the direction of action of the centrifugal force and the flow of lubricant to the upper surface of the crank pin bearing when the same is in the positions indicated in Fig. 1 by the letters F, G and H respectively.

Fig. 10 is a view similar to Fig. 2, the crank pin bearing being shown in the same position as in said Fig. 2, during one of the succeeding revolutions.

Fig. 11 shows the crank pin bearing in position B on one of the succeeding revolutions.

Fig. 12 shows a modified structure embodying the present invention.

Fig. 13 shows another modification.

Fig. 14 is a sectional view taken on the line 14—14 of Fig. 13.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

In the drawings there is shown, by way of example, certain preferred embodiments of the present invention. Referring to Figs. 1 to 10 inclusive, the structure illustrated therein comprises an internal combustion engine having a cylinder 15 in which there is slidably fitted for reciprocating motion a piston 16. Said piston 16 is adapted to carry a wrist or piston pin 17. A crankshaft 18 is mounted for rotative motion in suitable bearings 19. Each of the crank pins 20 of said crankshaft 18 is connected with the wrist pin 17 in the corresponding engine cylinder by means of a connecting rod 21 which is provided at its upper end with a usual wrist pin bearing 22 and at its lower end with a crank pin bearing 23 adapted to embrace the crank pin 20, this crank pin bearing 23 being constructed in two parts or halves, namely, an upper bearing part 23a and a lower bearing part or cap 23b. The inner cylindrical faces of the parts 23a and 23b are provided with a conventional babbitt lining 24 and 25 respectively, for forming the bearing faces or working surfaces embracing the crank pin 20. The crank pin bearing portions 23a and 23b are provided with bosses 26 having vertically alined holes for the reception of bolts 27 by means of which said parts are secured together.

The lower part or cap 23b of the crank pin bearing 23 is provided at its lower end with a scoop 28 and an upwardly extending oil passage or conduit 29 extending through the babbitt lining 25 by means of a port 30. Adjacent the port 30 the babbitt lining 25 is cut or milled out to provide a central deep groove or channel pocket 31.

The channel pocket 31 is connected by means of a duct 32 with a lower oil reservoir 33 provided in the body of said cap 23b under said channel pocket 31. It should be noted at this instance, that the oil passage 29 and the lower oil reservoir 33 do not communicate except through the pocket 31 and the duct 32. In the body of the upper part 23a of the crank pin bearing 23 there is provided an upper oil reservoir 34 which is connected with said lower oil reservoir 33 by means of a conduit 35 extending around the crank pin 20. The conduit 35 protrudes into said lower reservoir 33 with its portion 35a, while its upper end 35b opens into the upper oil reservoir 34 substantially at the center line thereof.

A conduit 36 is provided in the body of the connecting rod 21 for the purpose of connecting the upper oil reservoir 34 with the wrist pin bearing 22. The lower end 36a of said conduit protrudes into said upper oil reservoir 34 for a certain distance, while its upper end 36b opens into the channel pocket 37 provided in the lining 38 of the wrist pin bearing 22. An inclined passage 39 is provided for the purpose of connecting the upper oil reservoir 34 with the upper working surface of the crank pin bearing 23.

In operation, when the piston 16 reciprocates in the cylinder 15, the crank pin 20 moves on a circular path indicated in Fig. 1, letters A to H inclusive, indicating the eight reference positions of said crank pin. Letters E and A indicate the positions of the crank pin 20 when the piston 16 is at its upper and its lower dead center, respectively.

It is well appreciated that the serious load conditions at the piston pin and crank pin bearings occur during the working or power stroke of the piston, that is to say substantially between the positions E and A of Fig. 1. In these conditions the entire force of the piston produced by the explosion pressure is applied to the wrist pin 17 and by said pin it is exerted on the lower part of the wrist pin bearing 22. Being further transmitted by said bearing to the body of the connecting rod 21, the working force is next applied to the upper part 23a of the crank pin bearing, and by said bearing it is exerted on the crank pin 20 of the crankshaft 18. Therefore, in positions F, G and H the pressure per unit area of the mating surfaces of the piston pin 17 and the lower part of the bearing 22 at the upper end of the connecting rod, and the bearing surface 23a and the upper surface of the crank pin 20 is particularly high, and an ample supply of lubricant under sufficiently high pressure must be available for these surfaces during the specified time intervals if undue wear and premature failure of said bearing are to be prevented.

For a correct understanding of the following explanation it should also be appreciated that the ends of a connecting rod are subjected in operation to forces which produce two distinctly different types of motion at said ends. The lower end of the connecting rod rotates in a clockwise direction at a substantially uniform angular velocity following a circular path determined by the stroke of the crankshaft. The lower end of the connecting rod is subjected to a centrifugal force acting in a radial direction away from the center of the crankshaft 18. The relative rotation of the crank pin 20 with respect to the bearing portions 23a and 23b is also in the clockwise direction, which operates to wipe the oil around said crank pin also in the clockwise direction. On the other hand, the upper end of the connecting rod moves along a straight line path, and it comes to a complete rest twice during one revolution of the crankshaft. The forces acting on the bearing 22 are caused mainly by the working stroke of the piston and the inertia forces resulting from the acceleration and retardation of the linear motion of the reciprocating parts. It is an important feature of the present invention that centrifugal forces as well as forces of inertia instead of being permitted to affect adversely the proper functioning of the lubrication system are utilized for the purpose of creating pressure impulses in the lubricant conduits, whereby the lubricant is delivered at predetermined instances of the rotative cycle and to such portions of the working surfaces of the bearings at which it is needed most.

In Fig. 2 there is shown the lower end of the connecting rod with the crank pin bearing 23 when the same is in the position indicated in Fig. 1 by the letter A corresponding to the lower dead center position of the piston. It can be seen from an examination of said Fig. 2 that as said end rotating at high angular velocity passes said position A, the oil scoop 28 emerges from the oil bath 40 provided in an oil pan 41. Because of the inclined arrangement of said scoop 28, the oil rises at a high relative velocity along the oil passage 29 into the channel pocket 31 in which pocket the energy of velocity of the oil is converted into pressure energy. Such conditions prevail for a certain length of time, the exact duration whereof is dependent upon the rotative speed of the engine and the level of oil in the bath 40. Under these conditions, because of the pressure in said pocket 31 and the wiping action of the crank pin 20, the oil from said pocket 31 is distributed over the lower surface of said crank pin mostly in the clockwise direction from said pocket, effecting lubrication and cooling of the mating surfaces of the babbitt lining 25 and the crank pin 20. Due to the plentiful oil supply under said conditions and the provision of the oil duct 32, a certain quantity of oil is passed from the pocket 31 into the lower oil reservoir 33 and the lower portion of the conduit 35, as shown in Fig. 3 illustrating the conditions in the crank pin bearing when the same passes the position indicated in Fig. 1 by the letter B.

As the crank pin bearing continues its travel through the position B (see Fig. 3), the direction of action of the centrifugal force indicated in the figures by the letter P changes from the direction indicated by arrows in Fig. 3 to that indicated by similar arrows in Fig. 4, in consequence whereof the oil filling the conduit 35 begins to rise in said conduit in accordance with the change of direction of said centrifugal force until it is passed to the upper end of the conduit 35 as shown in Fig. 5. As can be seen from an examination of said Fig. 5, the direction of action of the centrifugal force acting radially from the axis of rotation is such that the oil which is discharged into the upper oil reservoir 34 from said conduit 35 is pushed outwardly, as is clearly shown in the drawings. It can be further seen that under such conditions the centrifugal force acting on the oil in said upper oil reservoir 34 becomes effective to move said oil upward along the conduit 36 and toward the wrist pin bearing 22. It should be noted at this instance that because of the provision of the protruding portion 35a on said conduit 35 a certain amount of oil is entrapped in said lower reservoir 33 and in position D the same is held as indicated in Fig. 5.

When the connecting rod progresses on its path and moves to the position indicated by the letter E and illustrated in Fig. 6, the centrifugal force now acting along the conduit 36 and the duct 32 forces the oil upward to the lower working surfaces of the bearings 22 and 23 respectively. The action of the centrifugal force in the upward direction may force the entire quantity of oil from the lower oil reservoir 33 to the surface of the crank pin bearing 23 through the duct 32, while because of the provision of the protruding end 36a on the conduit 36 a certain quantity of oil is entrapped in the upper oil reservoir 34 as shown in said Fig. 6.

As the crank pin bearing moves to the position indicated by the letter F and illustrated in Fig. 7, the centrifugal force is acting in a direction substantially in accordance with the arrows P and slightly beyond a line normal to the passage 39. Acting on the oil entrapped in the upper oil reservoir 34 the centrifugal force causes filling of said conduit or passage 39 with oil. Moreover, in this position of the conduit 39 the centrifugal force produces a component force acting to force the oil from said conduit 39 toward the crank pin bearing 23.

In Fig. 8 illustrating the crank pin bearing in the position indicated by the letter G the direction of the centrifugal force with relation to the direction of the passage 39 is such that a substantial component force is produced by the centrifugal force and said component force indicated by the arrow L acts along said conduit 39 in the direction of the crank pin bearing 23 and urges the oil toward the upper working surface of said bearing.

In the position of the bearing illustrated in Fig. 9 and indicated in Fig. 1 by the letter H, the centrifugal force acts substantially along the conduit 39 and, therefore, the fluid pressure in the conduit 39 produced by said force is at its maximum. When the crank pin bearing returns to the original position indicated by the letter A, the succeeding cycle of rotation commences, and the conditions existing in said position during the succeeding cycle of rotation are illustrated in Fig. 10, the character A₂ being used in said figure for the purpose of reference. Under the conditions shown in said Fig. 10, the flow of oil at the lower working surface of the crank pin bearing 23 is substantially similar to that illustrated in Fig. 2, the point of difference being in the fact that the upper surface of said bearing is still lubricated from said passage 39 by the continued action of the centrifugal force.

Fig. 11 shows the crank pin bearing 23 when the position B is reached during the succeeding cycle of rotation. In this position the centrifugal force is about to become ineffective to force the oil from the conduit 39 to the upper working surface of the bearing. It should be noted that in the position B₂ the direction of centrifugal force is such that it tends to force the oil from the upper oil reservoir 34 back to the lower oil reservoir 33 through the conduit 35, thus possibly tending to crowd the lower reservoir to the exclusion of fresh oil. Such undesirable action of the centrifugal force in this position is prevented by the above described opening of the end 35b of the conduit 35 to the upper oil reservoir 34 substantially at the center line thereof. As shown in Fig. 11 the quantity of oil which remains in the reservoir 34 is not permitted to enter the conduit 35, and it is held in said reservoir and is available for delivery to the conduit 36 or 39 in the succeeding positions of the bearing.

The operation of my improved lubrication means in the remaining positions of the connecting rod on the succeeding cycles of rotation may be readily understood without a further description, since it is substantially similar to the operation thereof during the first cycle of rotation which has been described in detail.

It is an important feature of the present invention that the inertia of oil is utilized to supplement and increase the lubricant driving action of the centrifugal force, but it is prevented from interfering therewith. From an examination of the positions C, D and E it will be apparent that because of the retarded motion of the wrist pin 17 the inertia of the oil in the conduit 36 operates to increase the pressure of oil on the lower working surface of the wrist pin 17 and to distribute the oil at the surface thereof just before said surface is loaded by the pressure of explosion in the cylinder 15. When the connecting rod is in the position E corresponding to the upper dead center of the engine operation, the oil in the conduit 36 comes to rest, and as the upper end of the connecting rod begins to move downward, the oil tending to preserve its state of rest continues to press on the wrist pin working surface. Such action being amplified by the centrifugal force of rotation continues as the connecting rod moves away from the position E and until said connecting rod reaches the approximate position G, which is to say during approximately the maximum load period of the rotative cycle, and it produces a particularly dependable lubrication of the loaded surface of the wrist pin. On the other hand, because of the substantially uniform angular motion of oil in the conduit 39, no upward pressure of oil similar to the pressure in the upper end of the conduit 36 takes place at the bearing 23, and the action of the centrifugal force downward toward the upper bearing surface of the bearing 23 is in no way interfered with.

It will now be clear in view of the foregoing that the angle which the conduit 39 makes with the center line of the connecting rod determines the distance during the cycle of rotation at which the centrifugal force becomes effective to force the oil from the conduit 39 toward the bearing 23. By slightly changing said angle it is possible not only to regulate the time and duration of delivery of oil to the bearing 23 but even to prevent completely such action of the conduit and to cause the same to draw the oil away from said bearing. I prefer to have the conduit 39 form an angle of about 45° with the center line of the connecting rod. By virtue of such an arrangement and because of the effect of the change of angularity of the connecting rod, the delivery of oil from the conduit 39 toward the bearing 23 begins shortly after the connecting rod passes the position indicated by the letter E and before it reaches the position F. It is important to note that the location of the point at which the conduit 39 opens into the oil reservoir 34 is important; also the location of said oil reservoir with respect to the bearing 23 is important. Equally important are the respective locations of the lower oil reservoir 33 and of the lower opening of the conduit 36. By proper changes in said respective locations the delivery of oil from said oil reservoirs to the respective bearings can be governed both as to the start of discharge and to the duration thereof.

It is an important feature of the present invention that the increase in requirements for lubricant at the bearings because of the increase in engine speed is substantially satisfied by the approximately corresponding increase of the centrifugal force which increases as the square of the engine speed.

I prefer to make both the lower reservoir 33 and the upper oil reservoir 34 cylindrical in shape with their axes parallel to the axis of the bearing. One of the chief reasons for such a construction is convenience of manufacture, as both reservoirs may be formed by a single drilling operation.

Fig. 12 shows the lower end of a connecting rod provided with a crank pin bearing of the shell type instead of the spun babbitt bearing used in the structure illustrated in Figs. 1 to 11 inclusive. From an examination of Fig. 12, it can be seen that in said structure the duct or groove 41 provided in the body of the bearing performs the functions of the conduit 35 of the structure of Fig. 1. The structure shown in Fig. 13 differs from the structure of Fig. 12 in the arrangement and form of the upper oil reservoir. In the structure shown in said Fig. 13 the upper oil reservoir 42 is of a semi-cylindrical form, the angle of inclination of its side portion 42a being so selected as to adapt said portion to perform the function of the conduit 39 of the structure of Fig. 1. Operation of the lubrication means provided in the structures of said Figs. 12 and 13, and embodying my invention, can be easily understood by following the arrows indicating the flow of the lubricant and by the explanation of operation of the structure of Fig. 1.

Although the invention has been described in connection with an internal combustion engine depending on a splash system for supplying oil to the connecting rod, I do not desire to be limited to splash lubrication systems, since my invention is easily adaptable for other types of lubrication systems, such as to lubrication systems of the force feed or the gravity feed types.

I claim:

1. In a lubricated bearing structure having a journal and a bearing supporting the same, said journal and bearing being bodily movable along a curvilinear path, a lubricant conduit leading to the most loaded surface of the bearing to be lubricated, said conduit being so arranged with respect to the direction of action of the centrifugal force caused by the curvilinear motion of the bearing that said force produces a component force acting along said conduit in the direction of said lubricated most loaded bearing surface.

2. In a lubricated bodily rotatable bearing, a lubricant conduit provided in the body thereof and leading to the most loaded surface of the bearing to be lubricated, said conduit being so arranged with respect to the direction of action of the centrifugal force caused by the rotation of the bearing that said force produces at predetermined times a component force acting along said conduit toward said most loaded bearing surface.

3. In a lubricated bodily rotatable bearing, a conduit provided in the body thereof for delivering lubricant to the most loaded working surface of said bearing, means for supplying said conduit with a quantity of lubricant at a predetermined time of the rotation cycle, said conduit being so arranged with respect to the direction of action of the centrifugal force caused by the rotative movement of the bearing, that during a predetermined period of rotation cycle of the bearing said centrifugal force produces a component force acting along said conduit in the direction of said working surface, said component force forcing the lubricant from said conduit to said working surface.

4. In a lubricated bodily rotatable bearing, a lubricant conduit provided in the body of said bearing and leading to the most loaded working surface thereof, said conduit being adapted to change in rotation its angle of inclination with respect to the direction of action of the centrifugal force caused by the rotation of the bearing and to be disposed during a predetermined period of rotation cycle at such an angle with respect to the direction of action of the centrifugal force that the same becomes effective to force the lubricant from said conduit to the working surface of said bearing.

5. In a connecting rod, a crank pin bearing, a lubricant conduit above said crank pin bearing leading to the upper portion of the surface of the bearing to be lubricated, said conduit being so arranged that during substantialy the entire downward movement of said bearing the centrifugal force caused by the rotation thereof produces a component force acting along said conduit in the direction of the upper bearing surface of said crank pin bearing.

6. In a connecting rod, a crank pin bearing, an oil conduit carried by said connecting rod above said bearing and leading to the upper working surface thereof, said conduit being so arranged directionally that during substantially the entire downward rotative movement of said bearing, the centrifugal force of rotation becomes effective to move the oil from said conduit to said upper working surface of said crank pin bearing.

7. In an internal combustion engine having a lubricant receptacle and a connecting rod interconnecting the wrist pin of the piston and the crank pin of the crankshaft, a scoop for taking up a quantity of lubricant when the crank pin passes its lower position, means for conveying said lubricant to the lower portion of the crank pin bearing, means for simultaneously drawing part of said lubricant from said bearing, means for conveying the lubricant so drawn around the crank pin, and means for delivering the same partly to the wrist pin bearing, substantially when said bearing is moving past its uppermost position, and partly to the upper portion of the crank pin bearing substantially during the downward rotative movement thereof.

8. In an internal combustion engine having a lubricant receptacle, a wrist pin and a crank pin, and a connecting rod for interconnecting said pins; a wrist pin bearing and a crank pin bearing on said connecting rod at the top end and at the lower end thereof, respectively; a scoop on said connecting rod adapted to take up a quantity of lubricant from said receptacle substantially when the crank pin passes its lower position; means delivering said quantity of lubricant to the lower portion of the crank bearing and distributing it thereon; a reservoir in the connecting rod below said bearing; a conduit for passing into said reservoir a part of the lubricant from the locality of said crank bearing; means for delivering a portion of the lubricant so passed to said reservoir to the lower surface of the wrist pin bearing substantially during the upper part of the crank revolution; and means for delivering some of the remaining lubricant to the upper surface of the crank pin bearing substantially during the entire down stroke of the connecting rod.

9. In an internal combustion engine having a lubricant receptacle, a wrist pin and a crank pin, and a connecting rod for interconnecting said pins; a wrist pin bearing and a crank pin bearing on said connecting rod at the top end and at the lower end thereof, respectively; a scoop on said connecting rod adapted to take up a quantity of lubricant from said receptacle substantially when the crank pin passes its lower position; means delivering said quantity of lubricant to the lower portion of the crank bearing and distributing it thereon; a reservoir in the connecting rod below said bearing, a conduit for passing into said reservoir a part of the lubricant from the locality of said crank bearing; a conduit extending around the crank pin and adapted to convey a portion of the lubricant so passed to said reservoir to the lower surface of the wrist pin bearing substantially during the upper part of the crank revolution; means for delivering some of the remaining lubricant to the upper surface of the crank pin bearing substantially during the down stroke of the wrist pin; and means for entrapping the remaining lubricant for use in the succeeding revolutions of the crank pin.

10. In a connecting rod, a crank pin bearing and a wrist pin bearing, an oil reservoir within said connecting rod between said bearings and immediately above the crank pin, and means for delivering into said reservoir by operation of centrifugal force a quantity of oil substantially during the second quarter of the revolution of the crank pin bearing after bottom dead center.

11. In a connecting rod, a crank pin bearing and a wrist pin bearing, an oil reservoir carried by said connecting rod between said bearings immediately above said crank pin, means for delivering into said reservoir by operation of centrifugal force a quantity of oil substantially during the second quarter of revolution of the crank pin bearing after bottom dead center, and a conduit extending substantially parallel to the center line of the connecting rod and operatively connecting said reservoir and said wrist pin bearing.

12. In a connecting rod, a crank pin bearing and a wrist pin bearing, an oil reservoir carried by said connecting rod between said bearings immediately above said crank pin, means delivering into said reservoir by operation of centrifugal force a quantity of oil substantially during the second quarter of revolution of the crank pin bearing after bottom dead center, and a conduit extending substantially along the center line of the connecting rod and adapted to connect operatively said reservoir with the lower surface of said wrist pin bearing.

13. In a connecting rod, a crank pin bearing and a wrist pin bearing, an oil reservoir carried by said connecting rod between said bearings immediately above said crank pin, means delivering into said reservoir by operation of centrifugal force a quantity of oil substantially during the second quarter of revolution of the crank pin bearing after bottom dead center, and a conduit extending substantially parallel to the center line of the connecting rod and operatively connecting said reservoir and said wrist pin bearing, said conduit protruding for a predetermined distance into said reservoir.

14. In a connecting rod, a crank pin bearing and a wrist pin bearing, an oil reservoir carried by said connecting rod between said bearings, means delivering into said reservoir by operation of centrifugal force a quantity of oil substantially during the second quarter of revolution of the crank pin bearing after bottom dead center, a conduit extending substantially parallel to the center line of the connecting rod and operatively connecting said reservoir and said wrist pin bearing for delivering part of said quantity of oil to said wrist pin bearing, a protruding portion on said conduit extending for a predetermined distance into said reservoir for the purpose of entrapping a quantity of oil in said reservoir, and a conduit operatively connecting said reservoir with the upper surface of said crank pin bearing and adapted to permit the centrifugal force of rotation to force said entrapped oil from said reservoir to the upper surface of said crank pin bearing substantially during the down stroke of the connecting rod.

15. In a connecting rod, a crank pin bearing, a scoop on said connecting rod for picking up a quantity of oil, a conduit for passing said oil to said crank pin bearing, means for distributing said oil over the lower surface of said bearing, a reservoir on said connecting rod, a conduit through which the impact pressure of scooping action and the wiping action of the crank pin force part of said oil into said reservoir, said conduit being in addition adapted to cause the centrifugal force of rotation to force some of the oil from said reservoir back to the surface of said crank bearing substantially during the time of passing of said crank bearing through the upper portion of its rotation cycle.

16. In a connecting rod, the crank pin bearing and a wrist pin bearing; an upper oil reservoir situated above said crank pin bearing and a lower oil reservoir situated below said crank pin bearing; a scoop on said connecting rod for picking up a quantity of oil substantially when the crank pin bearing passes its lowermost position, means passing said oil by the impact pressure to the working surface of said crank pin bearing and further into said lower reservoir through a hole provided between said surface and said reservoir, a conduit extending around said crank pin bearing and connecting said lower and said upper reservoirs and causing the centrifugal force of rotation to force during the upward movement of the crank pin bearing a portion of oil from said lower into said upper reservoir.

17. In a connecting rod, a crank pin bearing and a wrist pin bearing; an upper oil reservoir situated above said crank pin bearing and a lower oil reservoir situated below said crank pin bearing; a scoop on said connecting rod for picking up a quantity of oil substantially when the crank pin bearing passes its lowermost position, means passing said oil by the impact pressure to the working surface of said crank pin bearing and further into said lower reservoir through a hole provided between said surface and said reservoir, a conduit extending around said crank pin bearing and connecting said lower and said upper reservoirs and causing the centrifugal force of rotation to force during the upward movement of the crank pin bearing a portion of oil from said lower into said upper reservoir, and a protruding portion on said conduit extending for a predetermined distance into said lower reservoir and enabling to entrap a quantity of oil in said lower reservoir, said conduit opening into said upper reservoir substantially in the middle thereof for preventing the oil remaining therein from returning into said lower reservoir.

18. In a connecting rod, a crank pin bearing and a wrist pin bearing; an upper oil reservoir situated above said crank pin bearing and a lower oil reservoir situated below said crank pin bearing; a scoop on said connecting rod for picking up a quantity of oil substantially when the crank pin bearing passes its lowermost position, means passing said oil by the impact pressure to the working surface of said crank pin bearing and further into said lower reservoir through a hole provided between said surface and said reservoir, a conduit extending around said crank pin bearing and connecting said lower and said upper reservoirs and causing the centrifugal force of rotation to force during the upward movement of the crank pin bearing a portion of oil from said lower into said upper reservoir, and a protruding portion on said conduit extending for a predetermined distance into said lower reservoir and enabling to entrap a quantity of oil in said lower reservoir.

DANA K. BADERTSCHER.